(12) United States Patent
Stenson et al.

(10) Patent No.: US 9,181,033 B2
(45) Date of Patent: Nov. 10, 2015

(54) TUBULAR CONVEYOR WITH CLEATED BELT

(71) Applicant: Ag Growth International Inc., Winnipeg, Manitoba (CA)

(72) Inventors: Arthur Stenson, Saskatchewan (CA); Ronald Klassen, Saskatchewan (CA)

(73) Assignee: Ag Growth International Inc. (CA)

( * ) Notice: Subject to any disclaimer, the term of this patent is extended or adjusted under 35 U.S.C. 154(b) by 0 days.

(21) Appl. No.: 14/137,406

(22) Filed: Dec. 20, 2013

(65) Prior Publication Data

US 2015/0175356 A1    Jun. 25, 2015

(30) Foreign Application Priority Data

Dec. 19, 2013  (CA) ...................................... 2836976

(51) Int. Cl.
*B65G 15/00*    (2006.01)
*B65G 15/56*    (2006.01)
*B65G 37/00*    (2006.01)

(52) U.S. Cl.
CPC ............... *B65G 15/56* (2013.01); *B65G 37/00* (2013.01)

(58) Field of Classification Search
USPC ................................ 198/690.2, 698, 716, 823
See application file for complete search history.

(56) References Cited

U.S. PATENT DOCUMENTS

| | | | |
|---|---|---|---|
| 1,744,933 A * | 1/1930 | Thoen | 198/716 |
| 3,178,011 A | 4/1965 | Oshanyk | |
| 3,311,221 A | 3/1967 | Burkitt et al. | |
| 3,326,354 A * | 6/1967 | Aydelott | 198/819 |
| 3,595,378 A * | 7/1971 | Kamisaka | 198/819 |
| 3,647,049 A | 3/1972 | Hartzell, Jr. | |
| 5,052,545 A * | 10/1991 | Gongen | 198/534 |
| 5,655,872 A * | 8/1997 | Plotkin | 414/526 |
| 5,727,918 A * | 3/1998 | Arend et al. | 414/140.4 |
| 6,170,646 B1 | 1/2001 | Kaeb et al. | |
| 6,360,878 B1 * | 3/2002 | Deal et al. | 198/819 |
| 7,000,758 B2 * | 2/2006 | Bjorklund | 198/716 |
| 7,690,499 B2 | 4/2010 | Smith et al. | |

OTHER PUBLICATIONS

Office action mailed Mar. 5, 2015 for Canadian Application No. 2836976.
Office action mailed Apr. 8, 2015 for Canadian Application No. 2836986.

* cited by examiner

*Primary Examiner* — William R Harp
(74) *Attorney, Agent, or Firm* — Michael G. Kelber; Neal, Gerber & Eisenberg LLP (57) ABSTRACT

A conveyor comprising a support frame, an inclined tube mounted to the support frame, a hopper at a lower end of the tube for receiving material, a spout at an upper end of the tube for discharging the material, a running plate extending inside the tube, and a cleated belt, supported by the running plate, that conveys the material from the hopper to the spout through the tube. The cleated belt comprises a plurality of spaced-apart cleats and wherein each cleat has a base extending transversely to a direction of travel of the belt and curved sides that curve upwardly and outwardly from the base.

20 Claims, 8 Drawing Sheets

TUBULAR CONVEYOR WITH CLEATED BELT

CROSS-REFERENCE TO RELATED APPLICATIONS

This application claims priority to Canadian Application No. CA 2836976, which was filed on Dec. 19, 2013 and is entitled "TUBULAR CONVEYOR WITH CLEATED BELT," and is also being filed simultaneously with U.S. patent application Ser. No. 14/137,520, entitled "TUBULAR CONVEYOR WITH CLEANOUT HAVING DETACHABLE COVER", both of which are incorporated herein by reference in their entirety.

TECHNICAL FIELD

The present invention relates generally to belted conveyors and, more particularly, to inclined tube-type conveyors.

BACKGROUND

In the agricultural industry conveyors are used to move seed, grain or other bulk materials. Augers are typically used to move products like grain and oil seeds, while belt conveyors are typically used for seed and delicate grains.

Belt tube conveyors typically have a conveyor belt with paddles or cleats to convey material from a hopper at a lower first end to a spout at an upper second end. With conventional designs, the flexible belt curls when passing through the tubular portion of the conveyor. A number of technical problems exist with belt tube conveyors. One problem is that material may flow backward, especially when the tube is inclined at a steep angle. In other words, it is challenging to achieve high capacity at steep angles with prior-art technologies. Another problem that arises with the prior-art technologies is cross-contamination of seeds when switching from one type of seed to another.

In view of the foregoing, an improved conveyor would thus be highly desirable.

SUMMARY

The present invention is directed to a conveyor having a cleated belt. This conveyor is an inclined tubular conveyor having a tube through which the cleated belt runs. This cleated belt has cleats (or paddles) with a cleat profile designed to fit inside a tube of the conveyor so as to minimize back flow of material. Although the conveyor is designed primarily for conveying seed, the conveyor may be used or adapted to convey other material, substances or products that have similar physical or flow characteristics.

One inventive aspect of the present disclosure is a conveyor comprising a support frame, an inclined tube mounted to the support frame, a hopper at a lower end of the tube for receiving material, a spout at an upper end of the tube for discharging the material, a running plate extending inside the tube, and a cleated belt, supported by the running plate, that conveys the material from the hopper to the spout through the tube. The cleated belt comprises a plurality of spaced-apart cleats and wherein each cleat has a base extending transversely to a direction of travel of the belt and curved sides that curve upwardly and outwardly from the base.

Another inventive aspect of the present disclosure is a method of conveying material. The method generally entails loading the material into a hopper, conveying the material up a tubular conveyor having a tube and a cleated belt running over a running plate in the tube, wherein the cleated belt comprises a plurality of spaced-apart cleats and wherein each cleat has a base extending transversely to a direction of travel of the belt and curved sides that curve upwardly and outwardly from the base, and discharging the material from a spout at an upper end of the tube.

Another inventive aspect of the present disclosure is a belt with a canvas finish on both sides and a plurality of spaced-apart cleats integrally formed with the canvas belt, wherein each cleat has a base extending transversely to a direction of travel of the belt and curved sides that curve upwardly and outwardly from the base.

A further inventive aspect of the present disclosure is a conveyor having a support frame, an inclined tube mounted to the support frame, a cleated belt that conveys the material from the hopper through the tube and a hopper at a lower end of the tube for receiving material, wherein the hopper comprises a cleanout unit with a detachable cover that is detachably mounted to the hopper.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
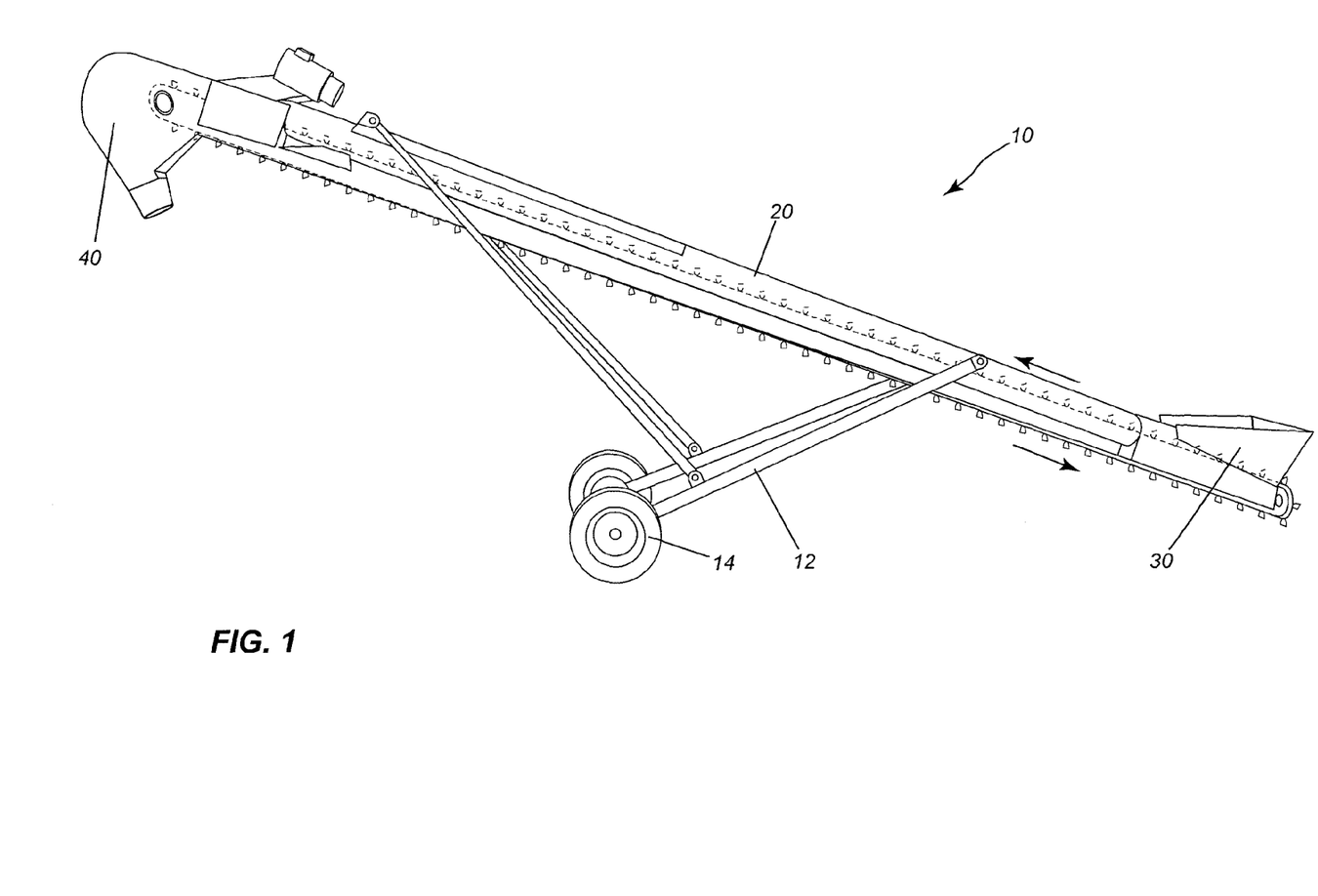
FIG. 1 depicts an inclined tubular conveyor in accordance with an embodiment of the present invention.

FIG. 1 depicts an inclined tubular conveyor, generally designated by reference numeral 10, in accordance with an embodiment of the present invention.

The conveyor 10 includes a support frame 12, which may have wheels 14 as shown by way of example in FIG. 1. Alternatively, the conveyor may be a fixed structure without wheels. The frame supports an inclined tube 20. A material-conveying belt carries material up the incline through the tube, as will be explained in greater detail below. The belt is a continuous loop driven by a drive pulley. An idler or roller is provided to support the belt. The drive pulley may be disposed near the top of the conveyor and the idler near the bottom of the conveyor or vice versa. The drive pulley is driven directly or indirectly by a motor, which may be a hydraulic motor, gasoline motor, electric motor, etc. The tube 20 may be permanently or detachably mounted to the support frame 12. The tube 20 may be attached at a fixed angle or it may be adjustable in angle. In one specific embodiment, the tube is adjustable in angle from 22 to 45 degrees, although other angle ranges may be possible in other embodiments. The conveyor may be a towed conveyor as shown in this figure or it may be a self-propelled conveyor. The conveyor may also be integrated within another agricultural product-handling vehicle or system.

As depicted in FIG. 1, the conveyor includes a hopper 30 (or hopper assembly) at a lower end of the tube 20 for receiving material such as seed.

As further depicted in FIG. 1, the conveyor includes a spout 40 at an upper end of the tube 20 for discharging the material.

Figure 2:
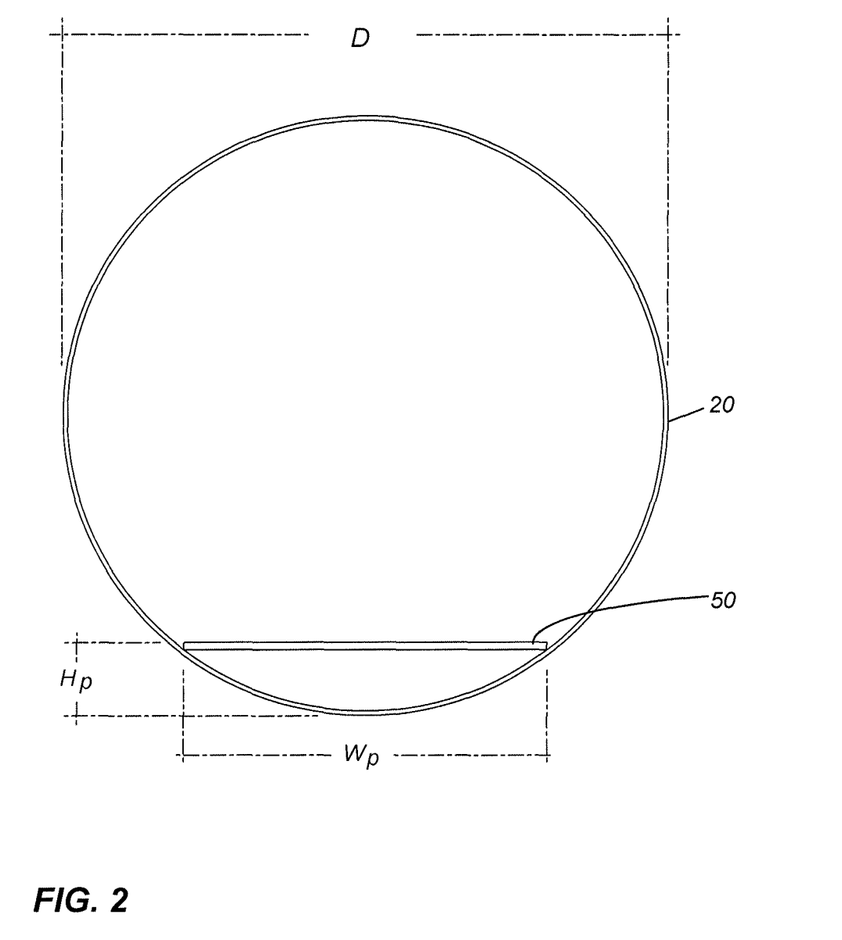
FIG. 2 is a cross-sectional view of a tube of the tubular conveyor showing the tube and running plate profile.

FIG. 2 is a cross-sectional view of the tube 20 of the tubular conveyor 10. This figure shows the tube and running plate profile. The running plate 50 extends inside the tube, acting like a floor, platform or support for the portion of the belt moving up the inclined tube. The running plate 50 acts as a false bottom in the tube to keep the central portion of the belt substantially flat while traversing the tube. The central portion may be understood as the portion spanned by the base of the paddle that runs over the running plate 50. The sides of the belt curl as the belt passes through the tube. However, only the sides curl, not the entire belt, which is to be contrasted with certain prior-art technologies such as, for example, the ones disclosed in U.S. Pat. No. 6,170,646 (Kaeb et al) and U.S. Pat. No. 3,311,221 (Burkitt et al.) in which the entire belt curls. By allowing only the sides to curl, the running plate 50 minimizes belt wear and maximizes product-conveying capacity. The running plate also maximizes product conveying capacity by raising up the belt, so the paddles travel up the tube at (or at least near) the tube's widest section. The running plate also has the effect of minimizing product leakage or backflow. It is to be noted that the return portion of the belt moving back down toward the hopper travels outside the tube and substantially parallel to the inclined tube.

In one embodiment, a width Wp of the running plate represents 50-70% of a diameter of the tube. In one specific embodiment, the width Wp of the running plate represents 60% of a diameter D of the tube. In one tested embodiment, which yielded excellent performance, the outer diameter D of the tube was 10 inches (25.4 cm) and the inner diameter 9.85 inches (25.0 cm), the width Wp of the plate was 6 inches (15.2 cm) so that the plate was at a plate height Hp of 1¼ inches (3.2 cm) above the bottom of the tube.

Figure 3:
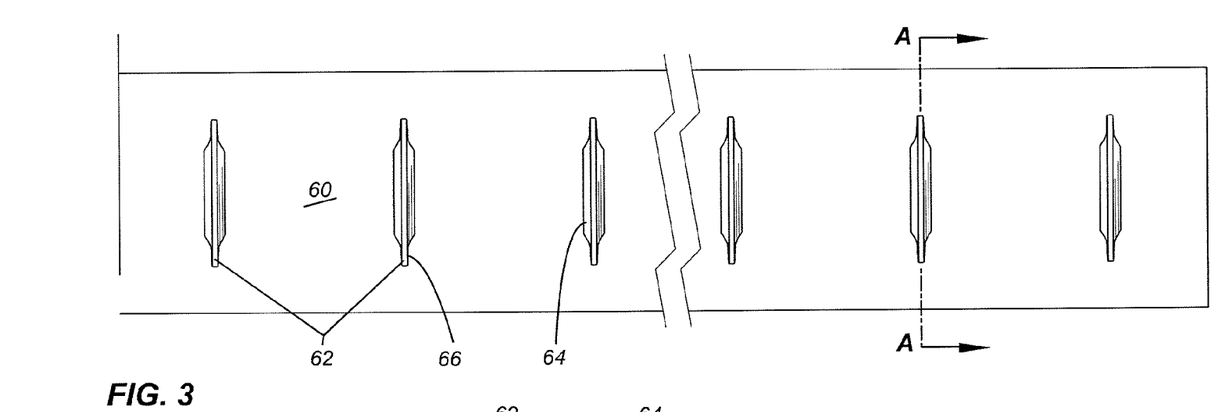
FIG. 3 is a top view of a cleated belt in accordance with an embodiment of the present invention.

FIG. 3 a top view showing a cleated belt 60. The cleated belt 60 is supported by the running plate 50. The cleated belt 60 conveys the material from the hopper to the spout through the tube 20. The cleated belt comprises a plurality of spaced-apart cleats 62. The spaced-apart cleats are equally spaced-apart in the illustrated embodiment although a different spacing pattern may be provided in other embodiments. As shown by way of example in FIG. 3, each cleat extends (is disposed) transversely to the belt 60, i.e. transversely or orthogonally to a direction of travel (or direction of conveyance) of the belt. Each cleat 62 has a base 64 which is also traverse or orthogonal to a direction of travel of the belt. Note that in the illustrated embodiment, the cleats (paddles) do not extend across the entire width of the belt but rather only across a portion of the belt width. In the illustrated embodiment, the cleat extends over less than ⅔ of the width of the belt. In one embodiment, the ratio of the belt width to the tube diameter is 3:2. In one tested embodiment, which yielded excellent results, the belt had a width of 15 inches (38.1 cm) and the tube an outer diameter D of 10 inches (25.4 cm) and an inner diameter of 9.85 inches (25.0 cm).

In one embodiment, the belt is two-ply canvas belt and the cleats are rubber or rubber-like. In one embodiment, the cleats are molded directly into the canvas belt. Although the molded cleats are integrally formed or molded into the canvas belt, other manufacturing techniques may be used to attach the cleats to the belt in other embodiments. The two-ply canvas belt may, in other embodiments, be replaced with a single-ply canvas belt, a multi-ply canvas belt (having more than 2 plies). The canvas belt may also be replaced, in other embodiments, with a fabric belt made of another type of fabric-like material.

Figure 4:
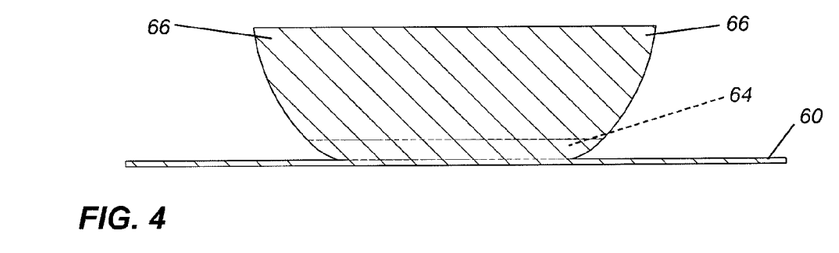
FIG. 4 is a cross sectional view of the cleated belt taken through section A-A in FIG. 3.

FIG. 4 is a cross-sectional view of the cleated belt taken through section A-A in FIG. 3. Each cleat 60 has curved sides 66 that curve upwardly and outwardly from the base 64. These sides 66 work in conjunction with the curled side portions of the belt to substantially match the inner curvature of the tube so as to provide a substantially sealed fit between the paddles and the inner wall of the tube. This design minimizes backflow of material, thereby maximizing throughput or capacity.

As illustrated by way of example in FIG. 4, each of the curved sides 66 has a first radius of curvature R1 curving from the base to a curvature-transition point CTP and a second radius of curvature R2 curving from the curvature-transition point CTP to a top of the cleat 68. In the illustrated embodiment, the second radius of curvature R2 is greater than the first radius of curvature R1. In another embodiment, there may be only a single radius of curvature. In yet another embodiment, there may be more than two radii of curvature.

Tests performed on an embodiment having a 15-inch (38.1 cm) wide 2-ply canvas belt with 3-inch (7.6 cm) high rubber paddles spaced 12 inches (30.5 cm) apart yielded excellent results with a paddle profile having a base width of 5.20 inches (13.2 cm), a top width of 9.12 inches (23.16 cm), R1 of 1.50 inches (3.81 cm), R2 of 4.38 inches (11.13 cm). Because the width of the tested belt was 15 inches (38.1 cm), the width of each side portion (measured from the outer top edge of the cleat to the edge of the belt) was 2.94 inches (7.46 cm) in the tested embodiment.

In one embodiment, a width of the base of each cleat is less than a width of the running plate. In one specific embodiment, a ratio of the width of the base to the width of the running plate is 13:15. Tests performed on an embodiment having a 5.2-inch (13.2 cm) wide base and a 6-inch (15.2 cm) wide running plate yielded excellent results.

Figure 5:
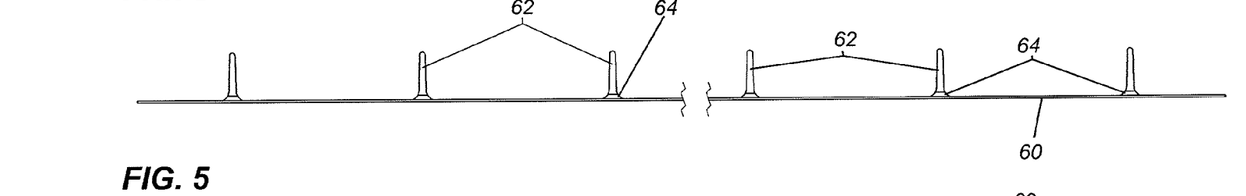
FIG. 5 is a side view of the cleated belt.

FIG. 5 is a side view of the cleated belt 60. In one embodiment, a spacing between adjacent paddles is three to five times a height of each paddle. In one specific embodiment, which is illustrated in FIG. 5, the spacing between adjacent paddles is four times a height of each paddle.

Figure 6:
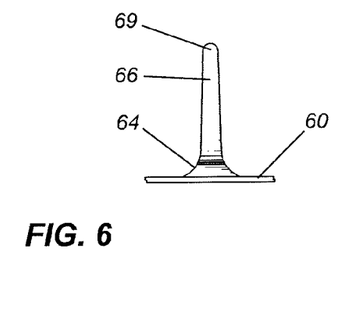
FIG. 6 is an enlarged side view of one cleat of FIG. 5.

FIG. 6 is an enlarged side view of one cleat of FIG. 5. In the illustrated embodiment, the cleat is a one-piece rubberized or elastomeric paddle, although in other embodiments, the cleat may be assembled or manufactured from multiple components. The base of each cleat (paddle) may be filleted on the leading and trailing paddle faces as shown, i.e. the cleat has a fillet or rounded corner on front and rear faces to attach to the belt. In the tested embodiment, the fillets had a radius of curvature Rf of 0.63 inches (1.59 cm) although other radii may be utilized. In one embodiment, a height Hc of each cleat is between 40 and 60% of the width Wp of the running plate. In one specific embodiment, the height Hc of each cleat is half the width Wp of the running plate.

Tests performed on an embodiment having a 6-inch (15.2 cm) wide running plate and 3-inch (7.6 cm) high cleats with a cleat spacing of 12 inches (30.5 cm) on a 15-inch (30.5 cm) wide belt running in a 10-inch (25.4 cm) tube yielded excellent results.

These tests suggest that good results may also be obtained using cleats with a base width less than a width of the running plate, and furthermore wherein the width of the running plate represents 50-70% of a diameter of the tube and wherein a height of each cleat is between 40 and 60% of the width of the running plate.

In one embodiment, each paddle (cleat) 62 has a tapered profile (cross-section) that tapers upwardly and terminates in a rounded top 69 as shown in this figure. In the tested embodiment, the tapered profile is characterized by a lower width WP1 of 0.64 inches (1.63 cm) at a point where the base merges into the upper portion of the paddle tapering to an upper width WP2 of 0.34 inches (0.87 cm) near the top of the paddle (where the paddle begins to curve to form its rounded top). It will be appreciated that some variability in these paddle dimensions may also yield good results.

Figure 7:
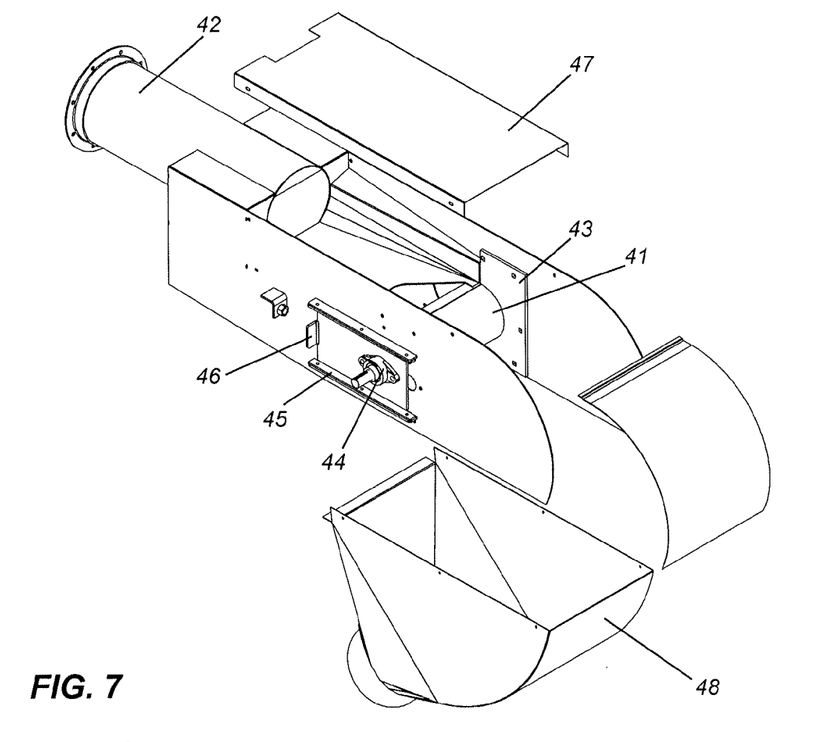
FIG. 7 is an isometric view of the paddle spout assembly.

FIG. 7 is an isometric view of the spout 40 (also referred to as the "paddle spout assembly" or "paddle spout"). The spout 40 of the conveyor 10 discharges the material (e.g. seed, grain or other such substance) from the belt. The spout 40 may include a pair of belt guide plates 43 (or wear plates) to seal the belt as it moves through the spout. In other words, the plates 43 substantially prevent seed or other material from returning on the return portion of the belt.

Figure 8:
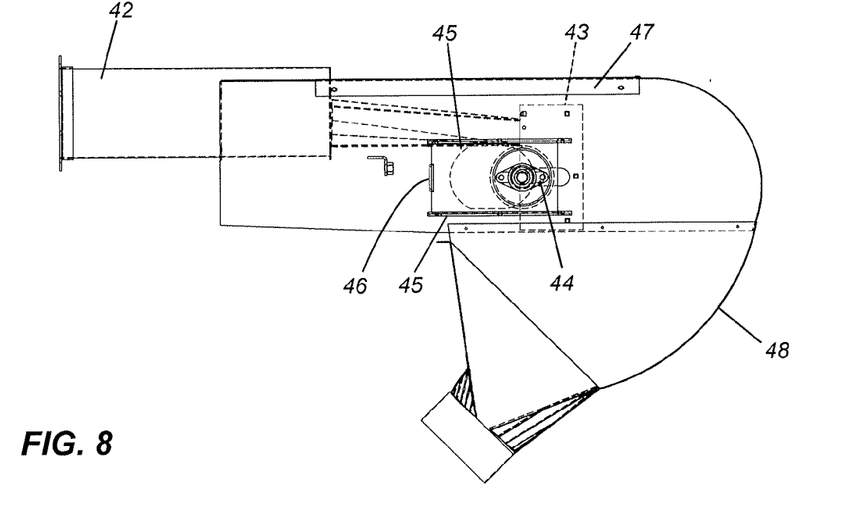
FIG. 8 is a side view of the paddle spout assembly.

FIG. 8 is a side view of the spout 40 (or "paddle spout assembly" or "spout assembly"). The spout 40 includes one cylindrical roller (or "paddle roller") 41, one tubular spout (or "paddle spout unit") 42, the two belt guide plates 43 mentioned in the paragraph above, two bearing units 44, four paddle spout retainer plates 45, and two paddle spout tightener plates 46. As further depicted by way of example in FIG. 7 and FIG. 8, a top cover 47 may be provided to cover the end portion of the belt. The top cover 47 may be detachably secured for removal for maintenance or cleaning. An outlet hood 48 may also be provided to funnel and discharge the material from the end of the conveyor in a desired direction. In the illustrated embodiment, the outlet hood 48 is angled downwardly and rearwardly at substantially a 45-degree angle to the tube such that, when the tube is inclined at 45 degrees, the outlet points vertically downward.

Figure 9:
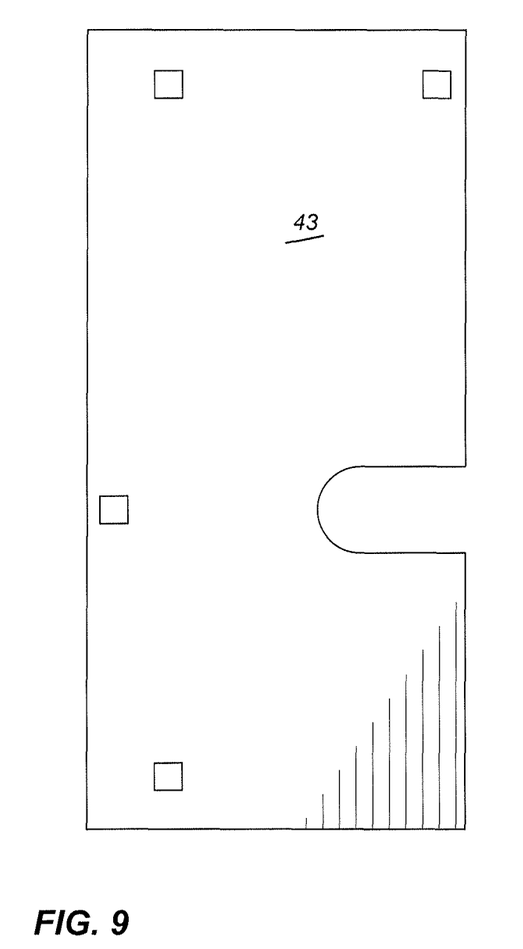
FIG. 9 is a front view of a belt guide plate.
Figure 10:
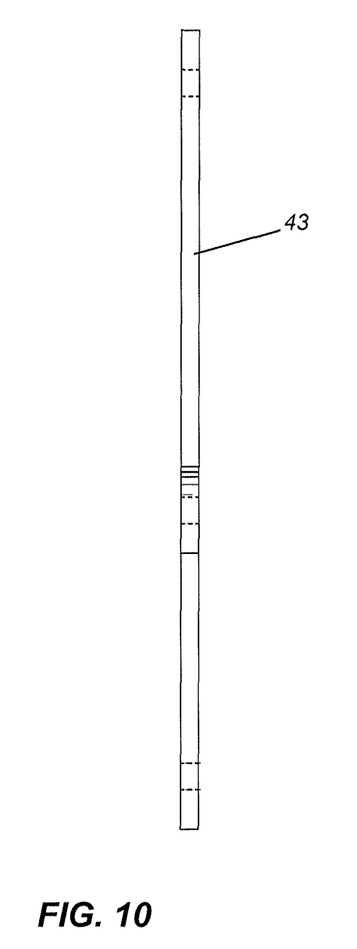
FIG. 10 is a side view of the plate.

FIGS. 9 and 10 are front and side views, respectively, of the belt guide plate 43. In one embodiment, this belt guide plate 43 is made of a polymer. The belt guide plates 43 seal the cleated belt 60 as the cleated belt 60 moves past the belt guide plates 43. The belt guide plates 43 seals the cleated belt 60 so that there is substantially no material, or at least only a minimal amount of material, on the return portion of the belt traveling back down toward the hopper.

Figures 11, 12, 13:
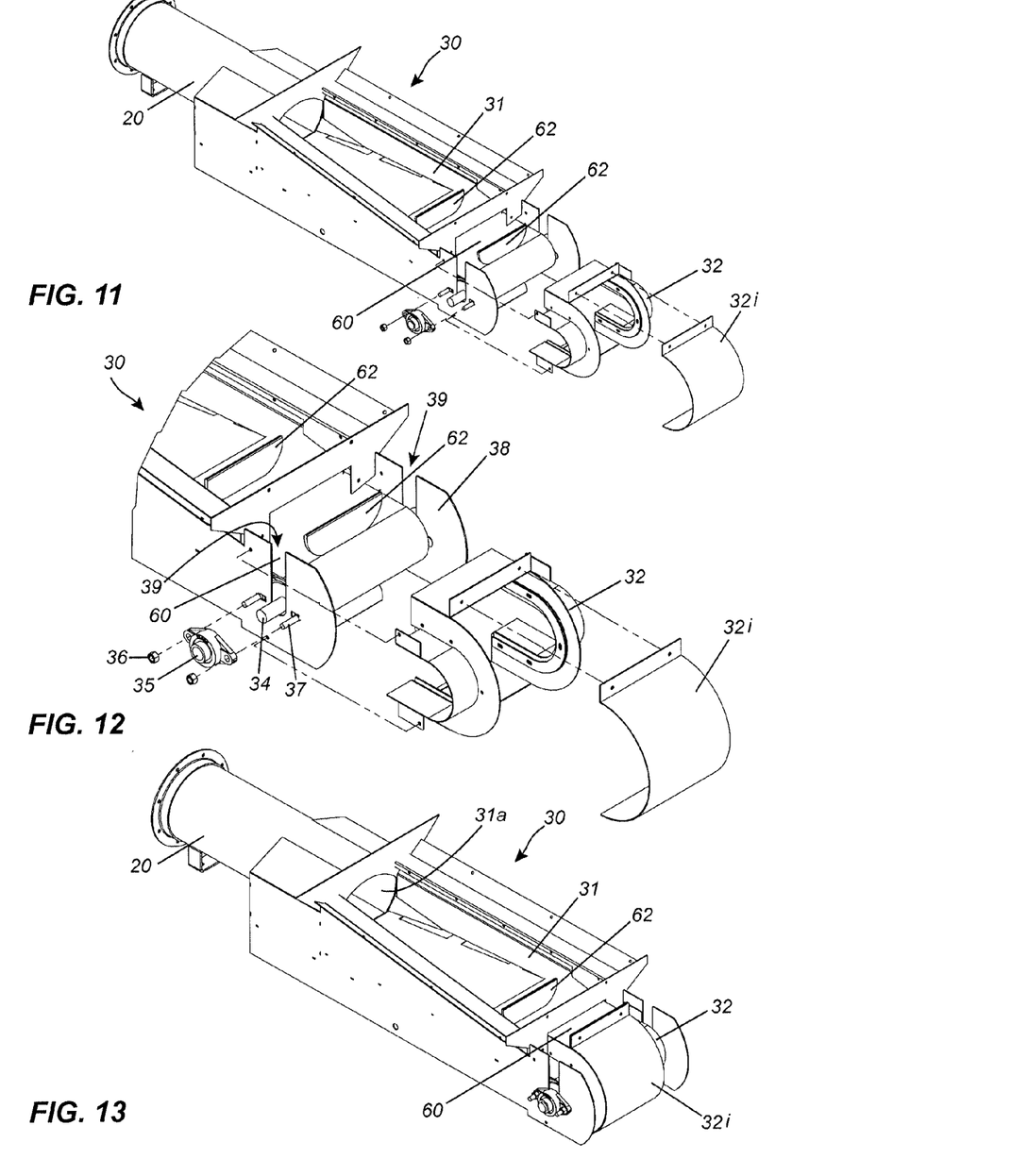
FIG. 11 is an exploded view of a hopper/cleanout assembly.
FIG. 12 is an enlarged view of the cleanout of FIG. 11.
FIG. 13 is an isometric view of the hopper/cleanout assembly.

FIG. 11 is an isometric exploded (or assembly) view of a hopper 30 (or "hopper assembly") that includes a hopper receptacle 31 for receiving material such as seed or grain and a cleanout unit with detachable cover 32 (also referred to as a "cleanout weldment"). The hopper receptacle 31 and cleanout unit detachable cover 32 may also be referred to as a hopper/cleanout assembly and for simplicity is denoted by the same reference 30 as the hopper or hopper assembly. The hopper receptacle 31 is connected via aperture 31a to the tube 20 or to a tube extension that connects to the tube 20. The cleated belt 60 (with its cleats 62 or paddles) runs around a lower-end roller that is enshrouded or covered by the cleanout unit with a detachable cover 32.

As shown by way of example in FIG. 11, the cleanout detachable cover 32i is a cover, cap or shroud that is detachable from the cleanout unit at its lower end, i.e. around the lower end roller of the conveyor. The cleanout detachable cover 32i may be detached from the cleanout unit to enable removal of material that may clog up the conveyor. The cleanout unit with a detachable cover 32 makes cleaning the hopper easy with very little chance of cross contamination of seed when changing from one type of seed to a different type of seed.

FIG. 12 is an enlarged exploded view of the hopper/cleanout assembly 30 of FIG. 11. The cleanout unit with a detachable cover 32 may be a generally U-shaped cover as shown in this embodiment.

Figure 14:
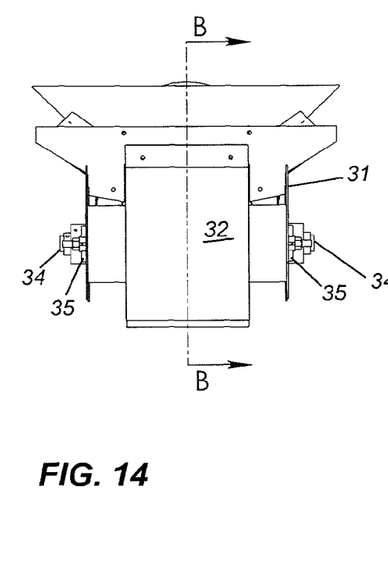
FIG. 14 is a front view of the hopper/cleanout assembly.
Figure 15:
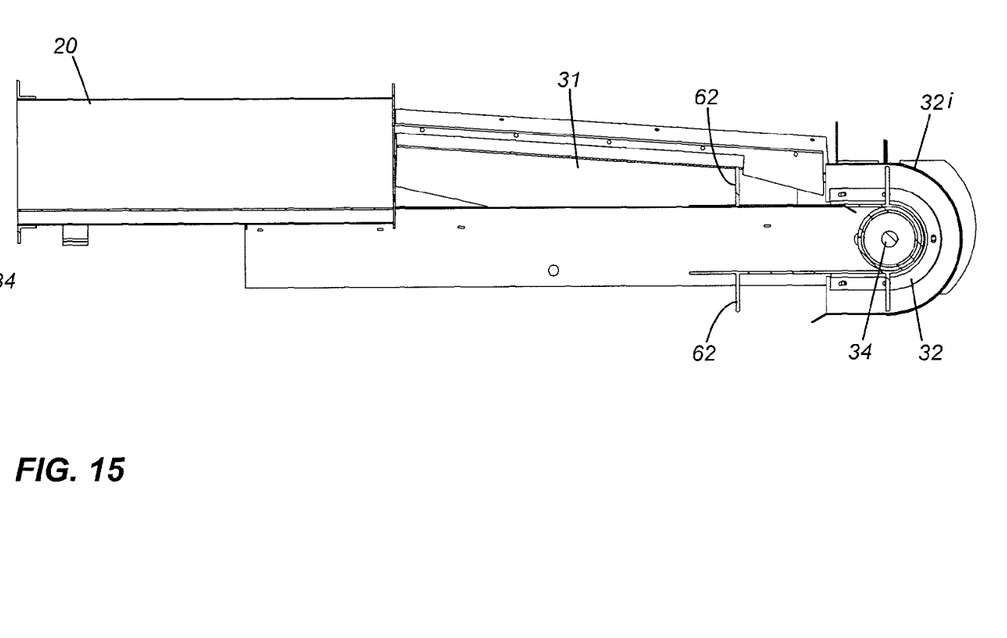
FIG. 15 is a sectional view taken through section B-B in FIG. 14.

FIG. 13 shows the fully assembled hopper/cleanout assembly 30 with the lowermost end of the cleated belt enshrouded or covered by the cleanout unit with a detachable cover 32 as it loops around the lower-end roller. FIG. 14 is a front view of the hopper/cleanout assembly 30. This figures illustrates that the cleanout unit with a detachable cover 32 is narrower than the width of the hopper receptacle 31, thereby defining two equal gaps of spaces on each side of the cover unit. FIG. 15 is a sectional view taken through section B-B in FIG. 14 showing how the cleated belt 60 passes inside the curved path defined by the U-shaped cover unit 32. As depicted in FIG. 15, there is a small clearance gap between the cleats 62 and the inner curved surface of the cleanout unit with a detachable cover 32. Due to the constant curvature of both the conveyor at the lower-end roller and the inner surface of the cleanout unit with a detachable cover 32, this clearance gap remains substantially constant for the entire path through the cleanout unit with a detachable cover 32.

As shown in FIGS. 12-15, a lower end roller 33 is mounted on a roller shaft 34 which is rotationally mounted on bearings (e.g. ball bearing or roller bearing) within bearing units 35. The bearing units 35 are mounted by nuts 36 and carriage bolts 37 to side walls (or side plates) 38 of the hopper/cleanout assembly 30. The lower end roller 33 may be a drive roller or an idler (passive roller). The roller 33 sits within a pair of slots 39 formed within the side plates 38.

Figure 16:
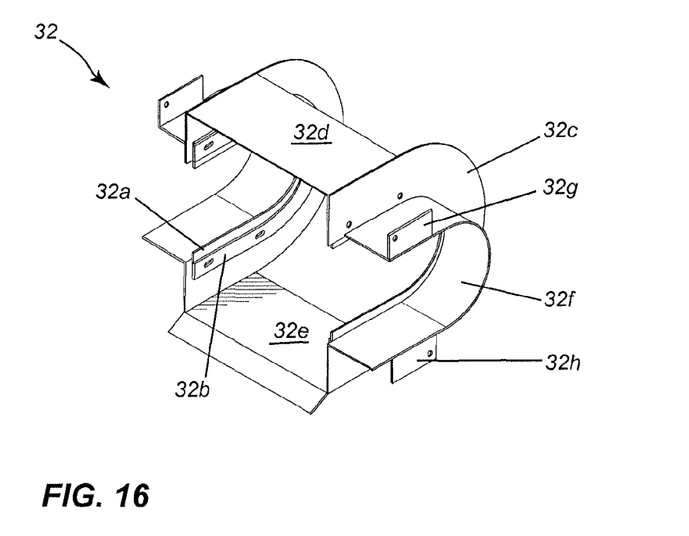
FIG. 16 is an isometric view of the cleanout unit with detachable cover.
Figure 17:
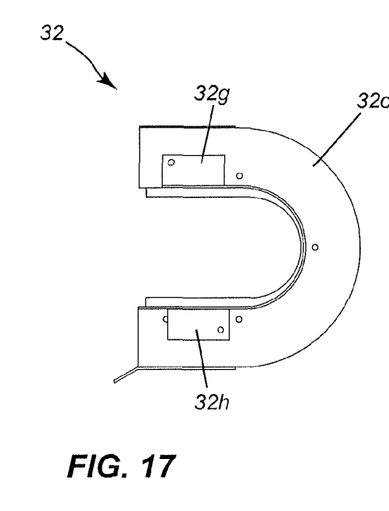
FIG. 17 is a side view of the cleanout unit with detachable cover.
Figure 18:
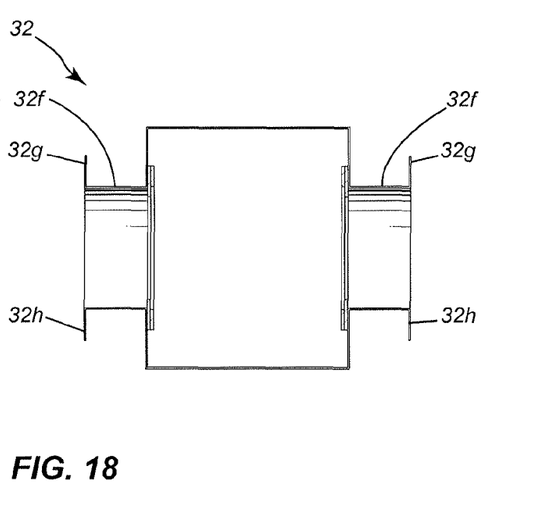
FIG. 18 is a front view of the cleanout unit with detachable cover.

FIGS. 16-18 are isometric, side and front views of one embodiment of the cleanout unit with a detachable cover 32. As noted above, this cover unit 32 may be referred to as a cleanout weldment, particularly for embodiments in which the cleanout cover unit is an assembly of welded metal components. As depicted by way of example in FIGS. 16-18, the cleanout unit with a detachable cover 32 includes a pair of rubber, rubber-like or elastomeric skirts 32a mounted to respective skirt-retaining plates 32b. The skirt-retaining plates 32b are supported by two spaced-apart curved side plates 32c which are, in turn, joined together by a top plate 32d and a bottom plate 32e. A pair of side spacers 32f extend laterally along the curved side plates 32c. A pair of top mount plates 32g and a pair of bottom mount plates 32h extend from the edges of the spacers 32f to provide mounting points for mounting (attaching or fastening) the cleanout unit with a detachable cover 32 to the side walls (or side plates) 38 of the hopper receptacle 31. The top mount plates 32g and the bottom mount plates 32h attach to the side plates of the hopper receptacle above and below a plane defined by the roller shaft 34 and carriage bolts 37.

This novel conveyor provides a number of advantages over the prior art. The conveyor can achieve a capacity of 3000 bushels/hour (106 cubic meters per hour) at a 40-degree incline and a belt speed of 440 ft/min (136 meters/min). The novel cleat profile enables the cleated belt to operate effectively and efficiently in a 10-inch (25.4 cm) tube. The novel cleat profile also seals on the edges of the belt so there are substantially no (or very minimal) gaps against the tube interior.

The novel conveyor may be used to perform a novel method of conveying material. This method entails loading the material into a hopper, conveying the material up a tubular conveyor having a tube and a cleated belt running over a running plate in the tube. The cleated belt comprises a plurality of spaced-apart cleats and wherein each cleat has a base extending transversely to a direction of travel of the belt and curved sides that curve upwardly and outwardly from the base. The method also includes discharging the material from a spout at an upper end of the tube. Conveying the material may involve using a canvas belt with rubber cleats. Edges of the canvas belt may fold when the belt runs through the tube such that the curved sides of the cleats match the inside curvature of the tube to convey the material up the conveyor. The method may further involve sealing the belt using a pair of belt guide plates at the spout.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed herein. The scope of the exclusive right sought by the applicant(s) is therefore intended to be limited solely by the appended claims.

The invention claimed is:

1. A conveyor comprising:
a support frame;
an inclined tube mounted to the support frame;
a hopper at a lower end of the tube for receiving material;
a spout at an upper end of the tube for discharging the material;
a running plate extending inside the tube; and
a cleated belt, supported by the running plate, that conveys the material from the hopper to the spout through the tube, wherein the cleated belt comprises a plurality of spaced-apart cleats and wherein each cleat has a base extending transversely to a direction of travel of the belt and curved sides that curve upwardly and outwardly from the base, wherein each of the curved sides has a first radius of curvature curving from the base to a curvature-transition point and a second radius of curvature curving from the curvature-transition point to a top of the cleat, wherein the second radius of curvature is greater than the first radius of curvature.

2. The conveyor as claimed in claim 1 wherein the belt is two-ply canvas and wherein the cleats are rubber, and wherein the cleats are molded directly into the belt.

3. The conveyor as claimed in claim 1 wherein a width of the base of each cleat is less than a width of the running plate.

4. The conveyor as claimed in claim 3 wherein a ratio of the width of the base to the width of the running plate is 13:15.

5. The conveyor as claimed in claim 1 wherein a height of each cleat is half a width of the running plate.

6. The conveyor as claimed in claim 1 wherein a width of the running plate represents 50-70% of a diameter of the tube.

7. The conveyor as claimed in claim 1 wherein a width of the running plate represents 60% of a diameter of the tube.

8. The conveyor as claimed in claim 1 wherein the spout comprises a pair of belt guide plates.

9. The conveyor as claimed in claim 1 wherein the hopper comprises a cleanout unit with a detachable cover that is detachably mounted over a lower end of the cleated belt.

10. The conveyor as claimed in claim 1 wherein a spacing between adjacent cleats is three to five times a height of each cleat.

11. The conveyor as claimed in claim 1 wherein a spacing between adjacent cleats is four times a height of each cleat.

12. The conveyor as claimed in claim 1 wherein:
a width of the base of each cleat is less than a width of the running plate;
the width of the running plate represents 50-70% of a diameter of the tube; and
a height of each cleat is between 40 and 60% of the width of the running plate.

13. A method of conveying material, the method comprising:
loading the material into a hopper;
conveying the material up a tubular conveyor having a tube and a cleated belt running over a running plate in the tube, wherein the cleated belt comprises a plurality of spaced-apart rubber cleats on a canvas belt and wherein each cleat has a base extending transversely to a direction of travel of the belt and curved sides that curve upwardly and outwardly from the base wherein edges of the canvas belt fold when the belt runs through the tube such that the curved sides of the cleats match the inside curvature of the tube to convey the material up the conveyor; and
discharging the material from a spout at an upper end of the tube.

14. The method as claimed in claim 13 further comprising sealing the belt using a pair of belt guide plates at the spout.

15. A cleated belt for a conveyor, the belt comprising:
a canvas belt; and
a plurality of spaced-apart cleats integrally formed with the canvas belt;
wherein each cleat has a base extending transversely to a direction of travel of the belt and curved sides that curve upwardly and outwardly from the base;
wherein the belt is two-ply canvas and wherein the cleats are rubber, and wherein the cleats are molded directly into the belt;
wherein each of the curved sides has a first radius of curvature curving from the base to a curvature-transition point and a second radius of curvature curving from the curvature-transition point to a top of the cleat, wherein the second radius of curvature is greater than the first radius of curvature.

16. The cleated belt as claimed in claim 15 wherein each of the curved sides has a first radius of curvature curving from the base to a curvature-transition point and a second radius of curvature curving from the curvature-transition point to a top of the cleat, wherein the second radius of curvature is greater than the first radius of curvature.

17. The cleated belt as claimed in claim 16 wherein a spacing between adjacent cleats is three to five times a height of each cleat.

18. The cleated belt as claimed in claim 17 wherein:
a width of the base of each cleat is less than a width of the running plate;
the width of the running plate represents 50-70% of a diameter of the tube; and
a height of each cleat is between 40 and 60% of the width of the running plate.

19. The cleated belt as claimed in claim 15 wherein a spacing between adjacent cleats is three to five times a height of each cleat.

20. The cleated belt as claimed in claim 15 wherein:
- a width of the base of each cleat is less than a width of the running plate;
- the width of the running plate represents 50-70% of a diameter of the tube; and
- a height of each cleat is between 40 and 60% of the width of the running plate.

\* \* \* \* \*